United States Patent [19]

Furuichi et al.

[11] 3,937,921
[45] Feb. 10, 1976

[54] TEMPERATURE CONTROL SYSTEM

[75] Inventors: Katsushi Furuichi, Yokohama; Kenji Kurita; Yoshimasa Kimura, both of Kawasaki; Hisashi Sakamaki, Yokohama, all of Japan

[73] Assignee: Canon Kabushiki Kaisha, Tokyo, Japan

[22] Filed: Apr. 17, 1974

[21] Appl. No.: 461,796

[30] Foreign Application Priority Data
Apr. 19, 1973 Japan.............................. 48-44440
Apr. 19, 1973 Japan.............................. 48-44441
May 30, 1973 Japan.............................. 48-60622
May 30, 1973 Japan.............................. 48-60624

[52] U.S. Cl................ 219/494; 219/489; 219/501
[51] Int. Cl.²........................................ H05B 1/02
[58] Field of Search........... 219/388, 494, 497, 501, 219/505, 4, 489

[56] References Cited
UNITED STATES PATENTS

| | | | |
|---|---|---|---|
| 3,018,356 | 1/1962 | Busch et al. | 219/489 |
| 3,221,141 | 11/1965 | Kannide | 219/413 |
| 3,221,143 | 11/1965 | Skala | 219/489 |
| 3,586,830 | 6/1971 | Leitner et al. | 219/501 |
| 3,636,310 | 1/1972 | Hosokawa | 219/501 |
| 3,646,577 | 2/1972 | Ernst | 219/501 X |

*Primary Examiner*—Volodymyr Y. Mayewsky
*Attorney, Agent, or Firm*—Fitzpatrick, Cella, Harper & Scinto

[57] ABSTRACT

A temperature control system comprises a heat sink heatable upon application of electric power thereto, an AC power source for heating the heat sink, temperature detector means for detecting the temperature of the heat sink, and control means for controlling the electric power applied to the heat sink in accordance with an output signal from the detector means so that the heat sink maintains its required temperature. The control means is operable to cause application of a full power of the power source to the heat sink at the initial heating stage thereof and application of a partial power of the power source to the heat sink when the temperature thereof is in the vicinity of the required temperature.

17 Claims, 17 Drawing Figures

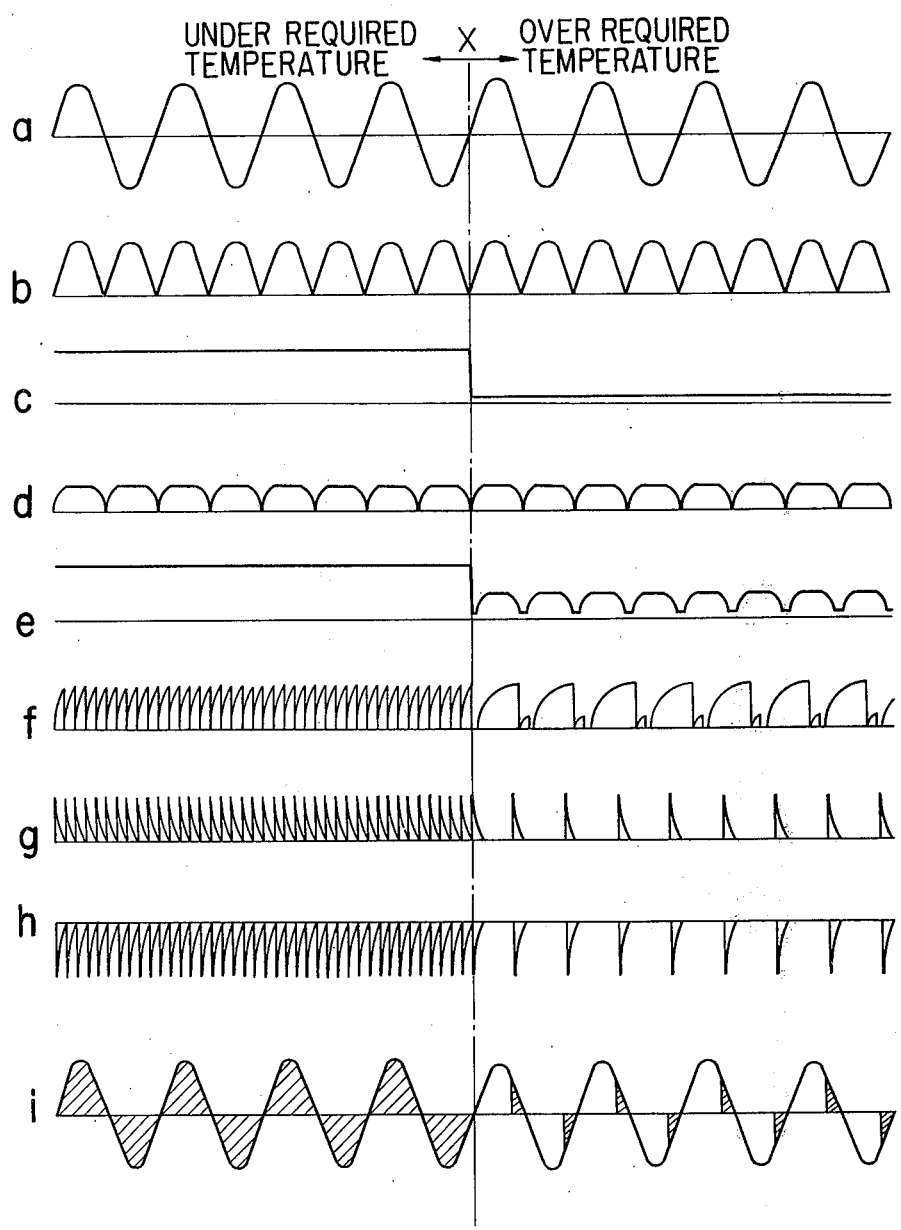

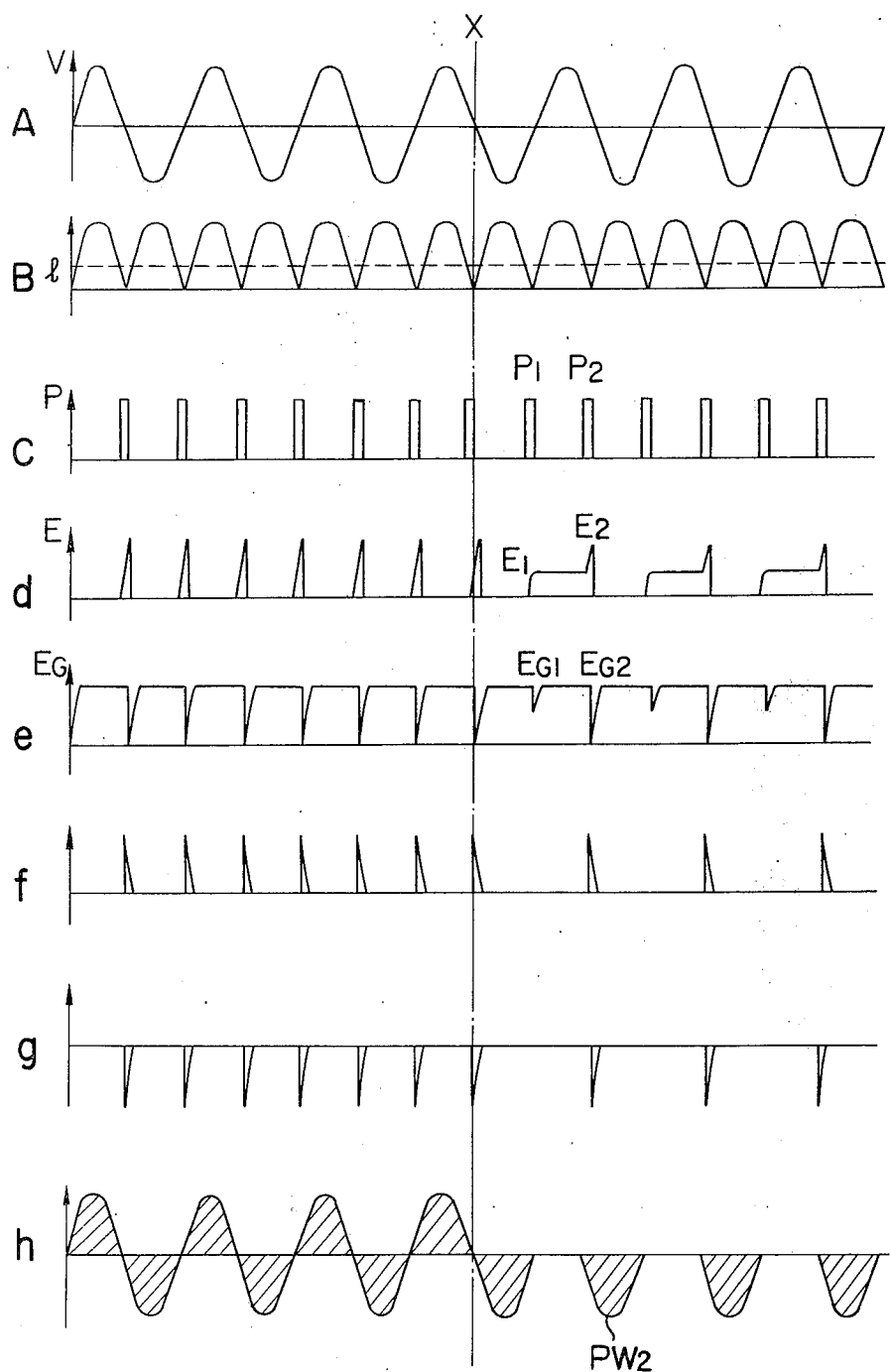

TEMPERATURE CONTROL SYSTEM

BACKGROUND OF THE INVENTION

1. Field of the Invention

This invention relates to a temperature control system for fixing-drying device or the like using heat in copiers, printers or other machine.

For the purpose of illustration, the invention will hereinafter be described with respect to an electrophotographic copying machine, but it should be understood that the invention is not limited thereto.

2. Description of the Prior Art

In an electrophotographic copying machine, a drum having a photosensitive layer in uniformly charged with corona discharge, whereafter the drum is exposed to image light to form an electrostatic latent image thereon. Toner is deposited on such electrostatic latent image to develop the same into a visible image, which is then transferred to ordinary paper. Such paper with the image transferred thereto is heated by a heat source to fix the toner on the paper. These are the typical steps of the process.

There are various types of the fixing device, such as type of using infrared ray lamps, type of using heated wind blower, type of employing metal plates of aluminum, copper, iron or the like heated by nichrome wires.

FIG. 1 of the accompanying drawings shows one of such conventional heating devices. The fixing device 11 comprises a plurality of infrared ray lamps 12, which are grouped into upper lamps 14 located above a sheet of paper 13 within the fixing device and lower lamps 15 located below the paper 13. The lower lamps 15 are normally turned on and the upper lamps 14 are turned on and off under the control of an output corresponding to a temperature as detected by a thermosensitive element 16 located within the fixing device. Thus, the temperature within the fixing device 11 is such as shown in FIG. 2, wherein it is seen: the upper and lower lamps are all turned on until a set temperature TO is reached; the upper lamps are turned off at a point of time $ta$ whereat the temperature within the device 11 reaches TO, but the temperature is somewhat raised by remaining heat and then falls; the upper lamps are again turned on after a point of time $tb$ is passed and the interior temperature becomes lower than the set level, whereas the temperature still continues to fall for some time because the upper lamps cannot immediately raise the temperature; after a predetermined length of time has passed, the temperature begins to rise and after a point of time $tc$ is passed, the upper lamps are again turned off. By repetition of such operation, the temperature within the fixing device is maintained substantially at TO. According to such system, however, the temperature distribution is irregular in such a manner that the temperature in the area above the paper located within the device is higher when the upper lamps are in ON condition, but lower when these lamps are OFF condition.

FIG. 3 shows another example of the conventional heating device, in which first nichrome wires 31 normally with a current applied thereto and second nichrome wores 33 ON-OFF controlled by the output from a thermosensitive element 32 are alternately arranged, an insulative material 34 surrounds these nichrome wires 31 and 33 and a metal plate 35 extends over the insulative material, whereby the metal plate 35 may be used as a radiator plate.

In such heating device, the second nichrome wires 33 are ON-OFF-controlled as in FIG. 1, and the temperature distribution within the fixing device is irregular in such a manner that the surface of the metal plate maintains a substantially uniform temperature distribution when both the first and the second nichrome wires are being heated but that when only the first nichrome wires are being energized, the portion of the metal plate adjacent the first nichrome wires is at a higher temperature while the portion of the metal plate adjacent the second nichrome wires is at a lower temperature. Further, the heat sink such as the normally heated first nichrome wires are serviced in the vicinity of a rated value of power and this reduces the durability of the heat sink.

As the means for eliminating these disadvantages, it would occur to propose to use a heat sink such as a single heater or the like and to cause the output of a thermosensitive element to continuously control the phase angle of an AC signal which is a driving signal for said heater. However, if such continuous control of the phase angle were resorted to, the driving signal would be switched at a high level point of the AC signal and this would result in production of noise. Further, according to such method, the required temperature could not quickly be obtained at the initial heating stage of the heat sink, that is, the rising would be slow.

SUMMARY OF THE INVENTION

It is an object of the present invention to provide a temperature control system which is capable of supplying the partial power from an AC power source when the heater temperature is at a predetermined level and is capable of supplying the full power from the power source during the time when the heater temperature falls below the predetermined level, so as to minimize the temperature drop in the heater caused by the application of an external load.

It is therefore an object of the present invention to provide a temperature control system which provides uniform distribution of electric power supplied to a heat sink such as heater or the like, thereby to provide uniform temperature distribution in the heater.

It is another object of the present invention to provide a temperature control system whereby the heater may quickly attain its required temperature at the initial heating stage thereof.

It is yet another object of the present invention to provide a temperature control system which permits a longer service life of the heater.

It is a further object of the present invention to provide a temperature control system whereby noise production during temperature control may be prevented.

It is a further object of the present invention to provide a temperature control system for heat sink adapted for use with fixing devices in electrophotographic copying machines.

These objects and features of the present invention will become more fully apparent from the following detailed description of some specific embodiments of the invention.

BRIEF DESCRIPTION OF THE DRAWINGS

FIG. 11 shows various waveforms for illustrating the operation of the various portions of FIG. 10.

FIG. 13 shows various waveforms for illustrating the operations of the various portions of FIG. 12.

DESCRIPTION OF THE PREFERRED EMBODIMENTS

Description will first be made of a form of the temperature control system whereby a full power is applied to a heat sink when it is below its required temperature and a predetermined partial power is applied to the heat sink when it is above the required temperature in accordance with the first and the second control signals which are mutually different.

Figure 7:
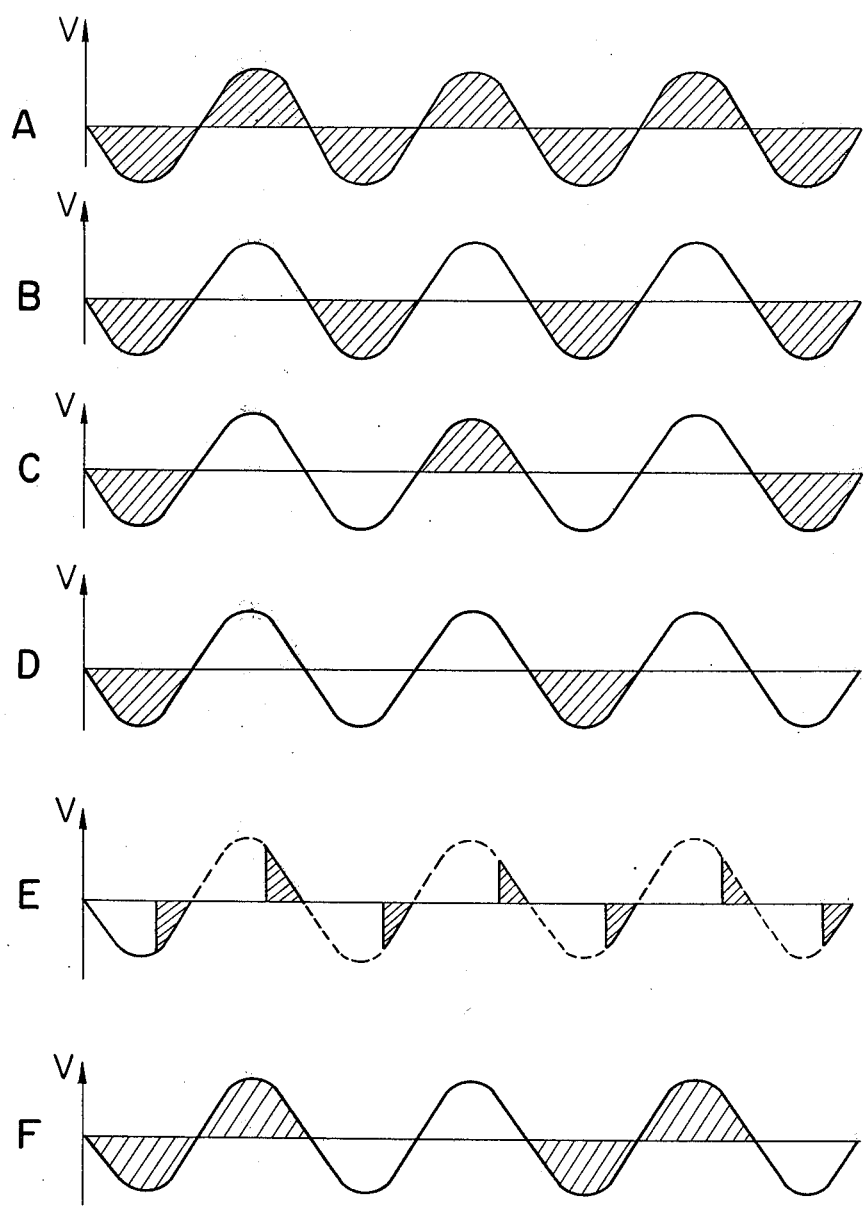
FIG. 7 shows waveforms for illustrating the operation of the temperature control systems shown in FIGS. 4 to 6.

To achieve the above-described objects, the present invention does not make a normally overheating heat sink and an ON-OFF-controlled heat sink separate from each other but makes them unitary to form a single heat sink which, when below its required temperature, may be heated by application thereto of a full power form an AC power source or of a partial power provided by half-period powers from the AC source corresponding to the then temperature of the heat sink and which, when exceeding the required temperature, may maintain the required temperature by application thereto of a predetermined partial power which may be part of the AC power waveform from the AC source. As the above-mentioned partial power, use may be made of a combination of the half-period power waveforms from the AC source as shown in FIGS. 7A, B, C, D and F, and particularly as the predetermined partial power to be applied to the heat sink when it exceeds the required temperature, use may be made of the waveform as shown in FIG. 7E which is provided by the AC source being phase-controlled.

Figure 1:
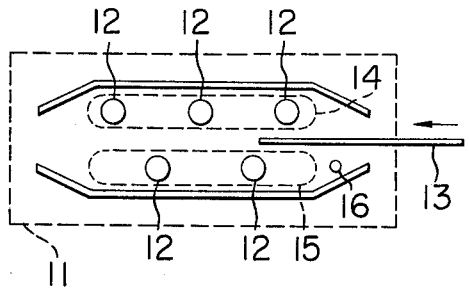
FIG. 1 illustrates a prior art fixing device in an electrophotographic copying machine.
Figure 2:
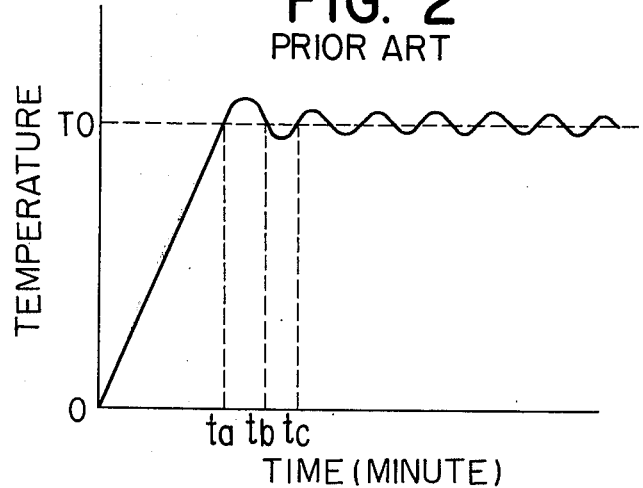
FIG. 2 is a graph illustrating the temperature control characteristic of the FIG. 1 fixing device.
Figure 3:
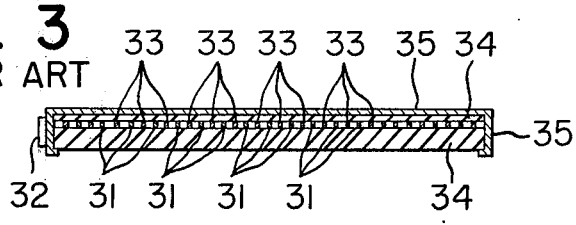
FIG. 3 illustrates a prior art heating device comprising normally heating heaters and controlling heaters alternately arranged.
Figure 4:
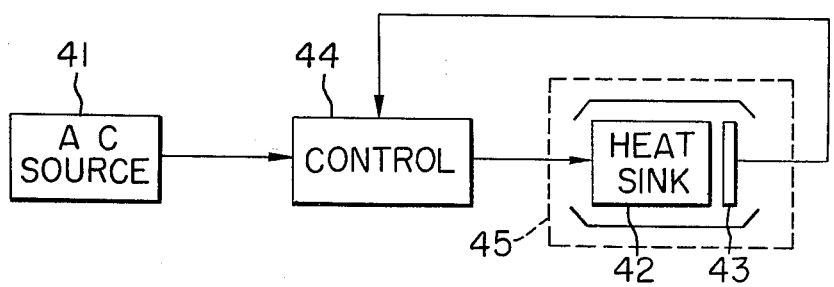
FIG. 4 is a block diagram of a temperature control system according to the present invention.

The basic operation of the present invention will now be described with reference to FIGS. 4 and 5. FIG. 4 shows a block diagram of a temperature control system whereby power from an AC source 41 is applied to control means 44 controlled by the output from the temperature detector means 43 such as thermosensitive element or the like disposed adjacent heat sink 42 such as heater or the like, so that the power supplied from the control means 44 to the heat sink 42 may take the form as shown in FIGS. 7A, B, C, D and E, or any other form, or the form of a combination thereof. In the initial heating stage of the heat sink 42, the temperature thereof is sufficiently lower than the required temperature level and therefore, such state is detected by the temperature detector means 43, whereafter the first signal is generated and all the half-cycles of the AC power shown in FIG. 7A, i.e. a full power, is applied to the heat sink 42. As the temperature of the heat sink 41 is increased, the required temperature is attained at a certain point of time, whereat the second signal is generated and the heat sink 42 begins to be heated at particular half-period intervals or by a phase-controlled partial power having a particular conduction angle.

Figure 5:
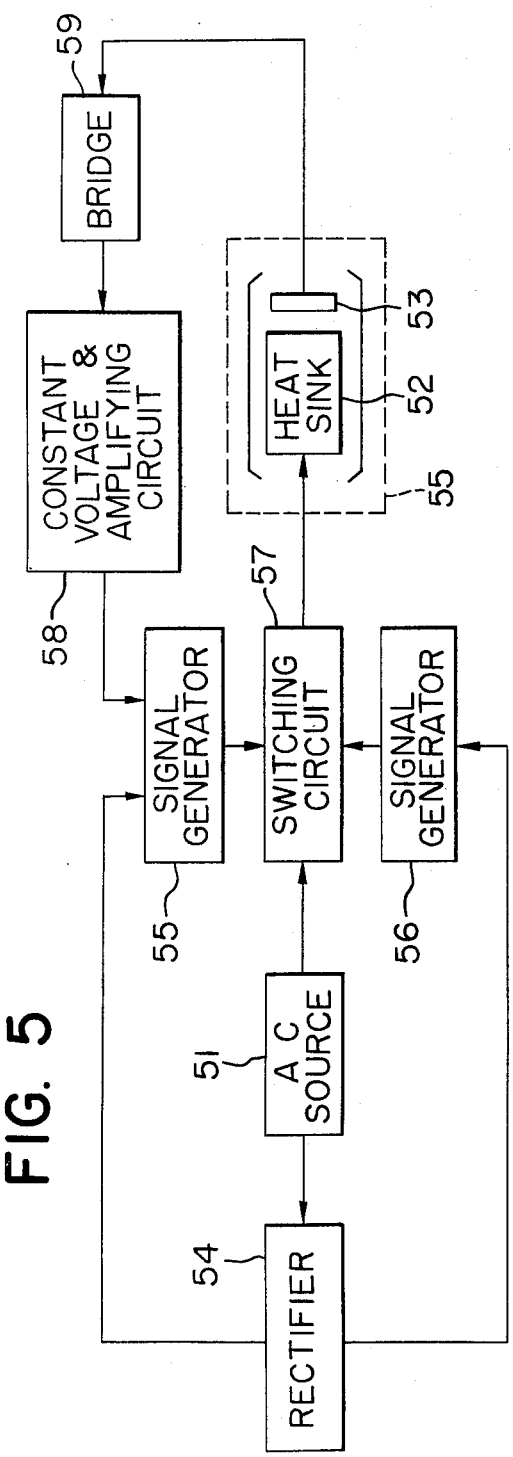
FIG. 5 is a further specific block diagram of the temperature control system according to the present invention.

FIG. 5 shows a further specific block diamgram of one temperature control system for controlling the power from AC source 51 by the output from temperature detector means 53 disposed adjacent a heat sink 52. From the initial heating stage of the heat sink 52 till a point at which its required temperature level is reached, the full power from the AC source is applied to the heat sink 52 to heat the latter and, only when the required temperature has been reached, the application of the full power is discontinued and instead thereof, the partial power as described above with respect to FIG. 4 is applied to the heat sink to maintain its required temperature stable if there is an application of an external load, such as a sheet fixed in contact with the heat sink.

Considering the operation of this embodiment, a rectifier 54 for rectifying the power from the AC source 51 produces a rectified wave which is applied both to the input of full-power signal generator means 55 and the input of partial-power signal generator means 56. A bridge 59 including the temperature detector means 53 as a part thereof is connected to the input of the signal generator means 55 through a constant voltage and amplifying circuit 58. When the heat sink is below its required temperature level, the output of the constant voltage and amplifying circuit 58 is prevented from being applied to the signal generator means 55, as a sresult of which the signal from such signal generator means is applied to switching means 57 to permit the full power to be applied to the heat sink 52. When the required temperature has been reached, the full power signal application is discontinued and the switching means is operated by the partial power signal generator means, which is normally oscillated by the aforesaid rectified wave, whereby a particular partial power is applied to the heat sink 52.

Figure 6:
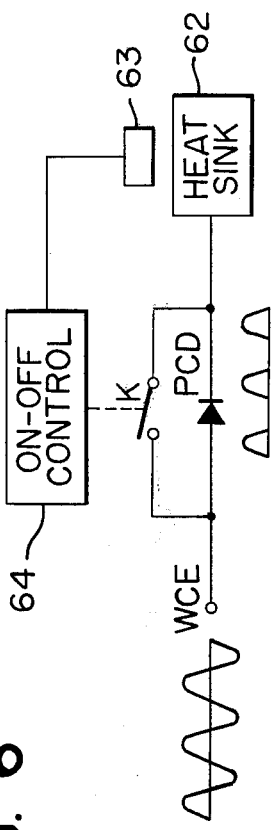
FIG. 6 is a block diagram of one temperature control system which uses a half-wave rectified power as a partial power.

When the partial power is to be set to about half the full power, the temperature control system may be designed as shown in FIG. 6, wherein when a heated portion heated by heat sink 62 is at a temperature above its required level, ON-OFF means K is opened by heat detector element 63 and ON-OFF control means 64 to make the full power from full power application terminal WCE through rectifier PCD into such a half-wave rectified power as shown in FIG. 7B, so that a partial power which is half the full power is applied to heat sink 62 to reduce the heating power thereof, and wherein when the heat sink is at a temperature below the required level, the ON-OFF means K is turned on by the temperature detector element 63 and ON-OFF control means 64 to short-circuit the rectifier PCD so as to permit the full power to be applied from the full power application terminal WCE to the heat sink 62, thereby increasing the heating power of the heat sink.

The present invention is designed such that the generation of the signal for causing sequential supply of the half-period powers from the AC source and the ON-OFF operation of the ON-OFF means K occur in synchronism with the vicinity of the zero potential across the AC power source by means of simple circuit system utilizing a first control element, a charge-and-discharge circuit and a second control element.

Figure 8:
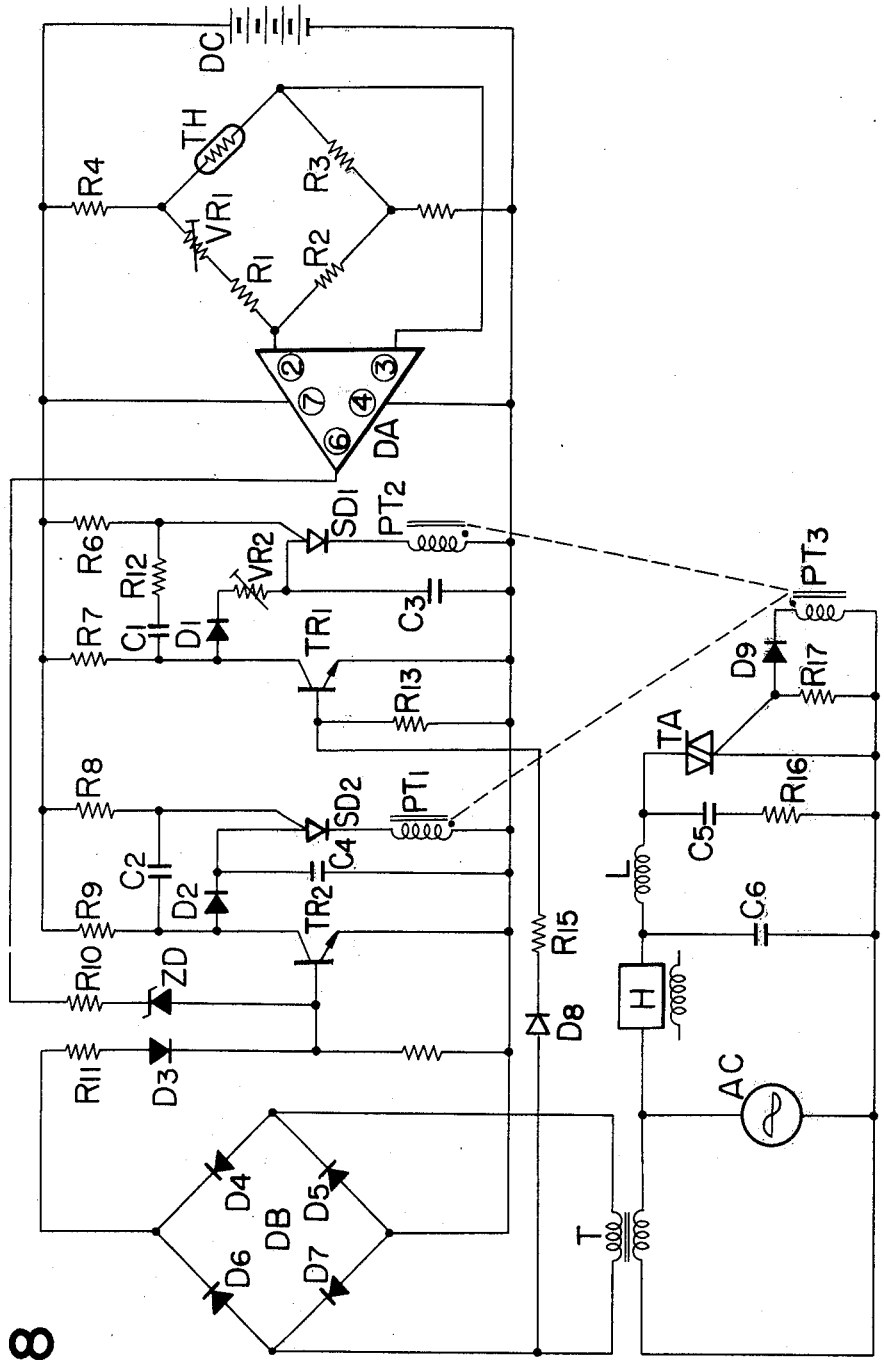
FIG. 8 diagrammatically shows one circuit arrangement of the temperature control system according to the present invention.
Figure 9:
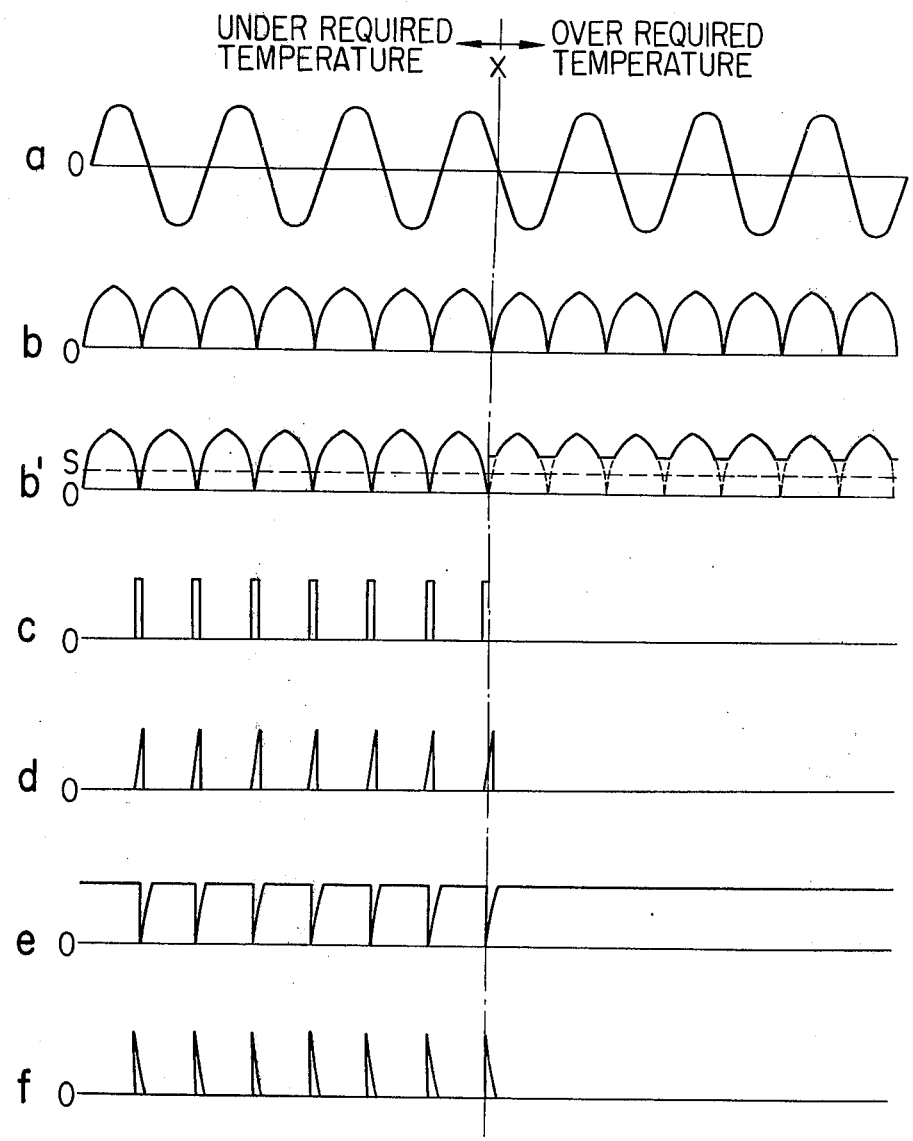
FIG. 9 shows various waveforms for illustrating the operations of the various portions of FIG. 8.
Figure 9:
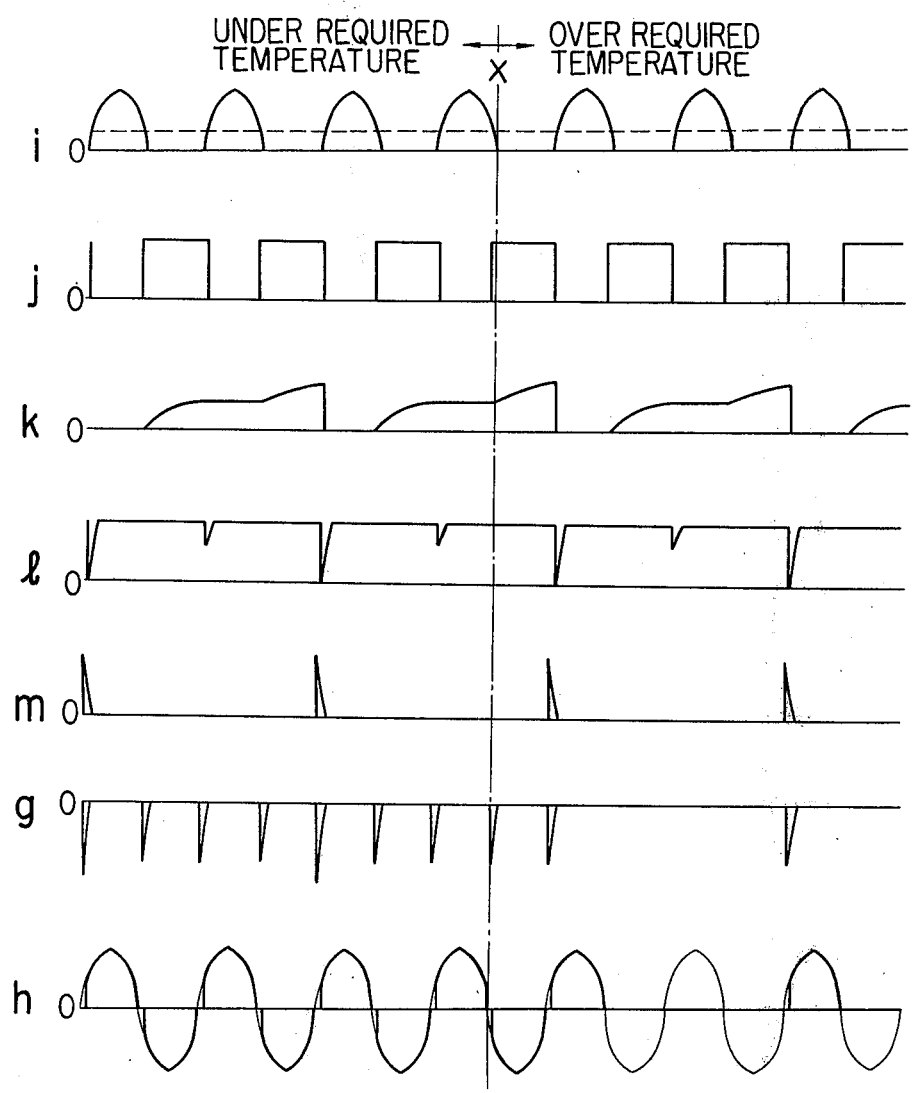

A control system in accordance with the present invention is also a system for supplying a load with electric power by either a signal indicating conducting current or a zero potential signal. FIG. 8 shows the circuit arrangement of the temperature control system which uses, as the predetermined partial power, a power from an AC power source with predetermined intervals between half-cycles, and FIG. 9 shows the waveforms for illustrating the operations of the various portions of such system. A thermistor TH, serving as a temperature detector element, cooperates with resistors R1, R2, R3 and semi-fixed resistor VR1 to constitute a bridge circuit to which a voltage is applied from a DC power source through resistors R4 and R5. The thermistor is operable to vary its resistance value with temperature variation and accordingly cause a variation in the deviation in the deviations of the voltage values of the resistors R1 and R2 forming part of the bridge circuit. A differential amplifier DA has terminals ④ and ⑦ for receiving input from the power source, terminals ② and ③ connected to the junction of the resistor R1 and R2 and to the junction of the thermistor TH and the resistor R3, respectively, for receiving signal inputs to detect the deviations of said voltage values, and a terminal ⑥ for providing signal output in accordance with said deviations. The output signal may be selectively applied to the base of transistor Tr2 through resistor R10 and Zener diode ZD. A full-wave rectifier circuit DB, provided by a bridge circuit of diodes D4, D5, D6 and D7, receives such an AC input as shown in FIG. 9a from an alternating power source AC through transformer T and outputs such a full-wave rectified wave as shown FIG. 9b. The output is applied to the base of the transistor Tr2 through resistor R11 and diode D3. Further, the AC current introduced from the transformer T is passed through diodes D5, D8 and resistor R15 so that such a half-wave rectified wave as shown in FIG. 9i is applied to the base of transistor Tr1.

It will be noted that a heating element H such as heater or the like is operable in response to power supply thereto from the power source AC and that the switching thereof is effected by Triac TA. Capacitors C5, C6, inductor L and resistor R16 are provided to ensure the switching operation by the Triac TA to be reliable. Further the inductor L and the capacitor C6 provide a noise preventing circuit for preventing noise components produced during ON-OFF operation of the Triac TA from flowing back toward the power source.

The temperature control system of the present invention will now be described with respect to the operating waveforms of the various portions thereof as shown in FIG. 9, wherein the left-side of line X refers to the case where the temperature of the portion to be heated by the heating element H is within a range lower than the desired temperature and the right-side of line X refers to the case where the temperature of the portion to be heated by the heat element H is within a range higher than the desired temperature.

When the temperature of the portion to be heated by the heating element H is within the lower range, the resistance value of the thermistor TH is high and accordingly, the voltage across the input terminal ③ of the differential amplifier DA is low, and the output from the terminal ⑥ is low, so output is thus sufficient to reach the Zener range of the Zener diode ZD and therefore, a full-wave rectified wave (see FIG. 9b) which is the output from the diode bridge DA as shown in FIG. 9b' is applied as base voltage to the base of the transistor Tr2. As a result, and if the threshold level of the transistor Tr2 is set to the dashed-line level indicated in FIG. 9b', the transistor Tr2 is turned on when the base voltage thereof is above the threshold level and turned off when the base voltage is below the threshold level. Thus, the collector voltage of the transistor Tr2 takes the pulse form produced at every half-period of the AC power source AC, as shown in FIG. 9c. When the tranistor Tr2 is in OFF state. collector potential of the transistor is at a high level, as shown in FIG. 9c, so that capacitor C4 is charged through resistor R9 and diode D2, as shown in FIG. 9d, while that voltage is applied to the anode of switching element SD2. Since, however, a high voltage substantially equal to the potential at the anode of switching element SD2, as is shown in FIG. 9e, is being applied to the gate of the switching element through resistor R8, the switching element SD2 is in OFF state. Next, when the transistor Tr2 is turned on, the current flows through resistor R9 so that the collector potential of the transistor Tr2 drops to a low level as shown in FIG. 9c and accordingly, a charging current flows to capacitor C2 through resistor R8, as a result of which the gate potential of switching element SD2 temporally drops to a low level as shown in FIG. 9e. Thus, the switching element SD2 is turned on to permit the charge stored in the capacitor C4 to be discharged through the switching element SD2 and the winding of pulse transformer PT1, whereby a pulse voltage produced at every half-period of the power source AC is induced across the winding, as shown in FIG. 9f.

Concurrently therewith, the transistor Tr1 is turned on and off with the dashed-line threshold level as the boundary because the half-wave rectified wave as shown in FIG. 9i is always applied to the base of that transistor, and this causes the collector voltage of the transistor Tr1 to take the form of the rectangular wave as shown in FIG. 9j. Therefore, when the transistor Tr1 is in OFF state, the collector voltage thereof is at a high level so that capacitor C3 is charged through resistor R7, diode D1 and semi-fixed resistor VR2. By suitably presetting the value of the semi-fixed resistor VR2, the charging time can be set to a desired value in accordance with the time constant of the capacitor C3 and resistor R7 and the preset semi-fixed resistor VR2. In the present embodiment, for example, design is made such that the capacitor is charged up to about half the collector voltage of the transistor Tr1 as long as such collector voltage is at its high level. At the same time, a voltage at the same level as that of the capacitor C3 is applied to the anode of the switching element SD1. The switching element SD1 is then in OFF state since a voltage at a level higher than the said anode potential is being applied to the gate of the switching element through resistor R6.

Subsequently, the transistor Tr1 is turned on to reduce its collector voltage to a low level, whereupon the capacitor C1 is charged through resistors R6 and R12 so that the gate potential of the switching element SD1 temporally drops, but the extent of such drop may be adjusted by suitably setting the resistor R12. In the present embodiment, design is made such that the extent of the drop is not below about half the collector voltage stored in the capacitor C3. Thus, the switching element SD1 still remains in OFF state regardless of the drop of the gate potential, because the voltage value of the switching element, by the capacitor C3. As a result, the charge in the capacitor C3 is maintained as is shown in FIG. 9k, as long as the transistor Tr1 is in ON state.

Next, when the transistor Tr1 is again turned on, the collector potential thereof reaches the high level, thereby to permit the capacitor C3 again to be charged as shown in FIG. 9k. In this case, it should also be noted that the switching element SD1 remains in OFF state because the charging voltage of the capacitor C3 never becomes higher than the gate voltage of the switching element SD1. When the transistor Tr1 has been turned on, the charging of the capacitor C1 occurs through resistors R6 and R12 and at this time, the gate voltage of the switching element SD1 drops as shown in FIG. 9l, but since the capacior C3 has been charged to a sufficiently high potential by that time and the anode potential of the switching element SD1 has thus become higher than the said dropped gate potential, the switching element SD1 is turned on to permit the charge stored in the capacitor C3 to be discharged through the switching element SD1 and the winding of pulse transformer PT2, whereby a pulse voltage produced at every second period of the power source AC is induced across the winding as shown in FIG. 9g.

By the circuit operation described so far, when the portion to be heated by the heating element such as heater or the like is within a low temperature range, a pulse voltage as shown in FIG. 9f is induced across the winding of the pulse transformer PT1 and a pulse voltage as shown in FIG. 9m is induced across the winding of the pulse transformer PT2, so that a pulse voltage produced at every half-period of the alternating power source AC is induced across the opposite polarity winding of pulse transformer PT3, as shown in FIG. 9g. As a result, a pulse trigger produced at every half-period of the power source AC is applied to the gate of the Triac TA and a substantially full-period cycle is applied from the power source AC to the heating element H, whereby the temperature of the portion to be heated by the heating element is raised.

It will be noted that diode D9 connected to the winding of pulse transformer PT3 serves to prevent the normal operation of the Triac TA from being impeded by stray capacity and electrical oscillations resulting from the winding.

When the application of the full power to the heating element H has caused the temperature of the heated portion to exceed the desired temperature level, the resistance value of the thermistor TH is decreased and accordingly, the voltage across the input terminal ③ of the differential amplifier DA is increased, so that the output from the terminal ⑥ becomes higher enough to enter the Zener range of Zener diode ZD and thus, the full-wave rectified wave as shown in FIG. 9b and the output from the differential amplifier DA are simultaneously applied to the base of transistor Tr2, as a result of which the voltage applied to the transistor Tr2 is higher than the threshold level of this transistor. Thus, the transistor Tr2 assumes its normal ON state with the collector potential thereof being at its normal low level, so that the pulse voltage induced across the pulse transformer PT1 as shown in FIG. 9f is nullified. As a result, only the pulse voltage produced at every second period of the alternating power source AC is induced across the winding of the pulse transformer PT3, as shown in FIG. 9g, and accordingly the Triac TA also effects switching operation at every second period of the power source AC to permit only a power frequency-divided into half-waveform at every second period, as shown in FIG. 9h, to be applied to the heating element, thus reducing the temperature rise of the heating element.

When the portion to be heated by the heating element is within the high temperature range, the selection of the frequency division may readily be done by adjustment of the semi-fixed resistor VR2 provided in the charging circuit for capacitor C3. Further, selection of a finer frequency division may be done by using a full-wave rectified wave, instead of a half-wave rectified wave, as the signal normally applied to the base of transistor Tr1.

Figure 10:
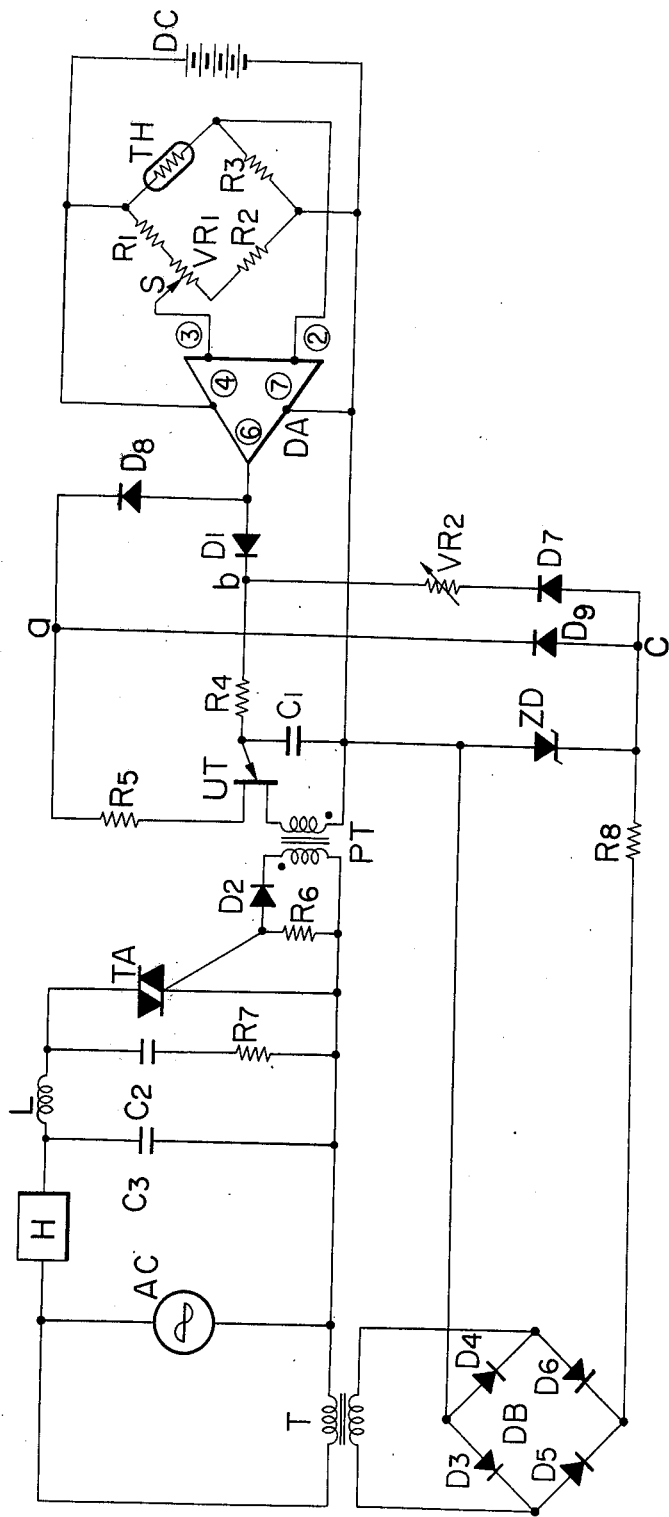
FIG. 10 diagrammatically shows another form of the circuit arrangement of the temperature control system according to the present invention.

FIG. 10 shows an embodiment of the present invention in which a power supplied from an alternating power source AC is phase-controlled and is used as the predetermined partial power, and FIG. 11 illustrates the waveforms for such embodiment. This embodiment is similar to that of FIG. 8 in that a bridge circuit comprising a thermistor is employed and the degree of balance thereof is used as the input to a differential amplifier DA, but differs from the embodiment of FIG. 8 in that the output of the differential amplifier DA is applied as input to a switching element UT through a diode and a resistor and that a signal for causing application of a partial power is always imparted through a variable resistor. A relatively simpler circuit in accordance with the present invention may provide the selection and utilization of electric power to be supplied.

The present embodiment will generally be described hereinafter. An AC voltage as shown in FIG. 11a is applied as input to bridge DB through transformer T, and this AC voltage is full-wave rectified by the bridge DB and outputed in the form of a full-wave rectified wave as shown in FIG. 11b. Such full-wave rectified wave is applied as input to Zener diode ZD through resistor R8, whereby it is cut by shorting a voltage above a predetermined level, and then applied through rectifier diode D7 and variable resistor VR2 to a point b in the circuit as a voltage of the waveform as shown in FIG. 11d.

A resistance bridge, comprising a thermistor TH, resistors R1, R2, R3 and variable resistor VR1, is designed with the variable resistor VR1 adjusted such that the resistance value of the thermistor TH renders the bridge into balanced condition when the portion to be heated is at the required temperature. Therefore, when the temperature of the portion to be heated is below the required temperature, the resistance value of the thermistor TH becomes higher and accordingly, the input voltage across the input terminal ② of the differential amplifier DA becomes lower than the input voltage across the terminal ③, so that the output voltage from the output terminal ⑥ is at a high level as shown in FIG. 11c. When the temperature of the portion to be heated is above the required level, the resistance value of the thermistor TH becomes lower and accordingly, the input voltage across the input terminal ② of the differential amplifier DA is higher than the input voltage across the terminal ③, so that the output voltage from the output terminal ⑥ is at a low level as shown in FIG. 11c. Thus, a high level of voltage, when the temperature of the portion to be heated is below the required level, and a low level of voltage, when that temperature is above the required level, is applied through rectifier diode D1 to the point $b$ in the circuit.

Similarly, a high level of voltage, when the temperature of the portion to be heated is below the required level, is applied to a point $a$ through the rectifier diode D8, and the voltage appeared at point $c$, when the temperature is above the required level, is applied to the point $a$ through the rectifier diode D9. Thus, it is feasible to stabilize the conduction angle of partial power of the power source, which is phase-controlled, in case the temperature is above the required level.

To the point $b$ in the circuit, as has been described above, there is applied a full-wave rectified voltage with predetermined peak portions cut away, as shown in FIG. 11d, and a high or a low level of voltage as shown in FIG. 11c, and as a result of this, the voltage at the point $b$ in the circuit is at the high level as shown to the right-side of line X in FIG. 11e when the portion to be heated is below the required temperature, and it becomes the full-wave rectified voltage with its predetermined peak portions cut away as shown to the right-side of line X in FIG. 11e when the portion to be heated is above the required temperature.

In the described manner, the voltage appearing at the point $b$ in the circuit is applied through resistor R4 to capacitor C1, which is thus charged, and this charging voltage directly provides the emitter voltage of the unijunction transistor UT. When this emitter voltage exceeds a predetermined value, the base-emitter of this transistor is rendered into ON state. Upon such ON operation of the transistor, the charge stored in the capacitor C1 is discharged through the primary winding of pulse transformer PT.

The charging rate of the capacitor C1 is determined by the capacity of the capacitor C1 and the magnitude of the charging resistance. For example, when the temperature of the portion to be heated is below the required level and accordingly the voltage at the point $b$ in the circuit is at the high level as shown in FIG. 11e, the charge is applied substantially in the direction from the differential amplifier DA and thus R4 is the only charging resistance, which means a high charging voltage and a low charging resistance and accordingly, a very high charging rate. When the temperature of the portion to be heated is above the required level and accordingly the voltage at the point $b$ is the full-wave rectified voltage with its predetermined peak portion cut away as shown in FIG. 11e, the charge is applied substantially in the direction from the diode bridge DB and thus the charging resistance is a serial connection of R8, VR2 and R4, which means a low charging voltage and a high charging resistance and accordingly, a very low charging rate. Thus, from the case where the portion to be heated is at a temperature below the required level to the case where the portion to be heated is at a temperature above the required level, there is a wide variation in the time required for the capacitor C1 to be charged to a voltage level sufficient to turn on the transistor UT, but finally adjustment is made so that such a charging-discharging characteristic as shown in FIG. 11f can be provided by suitably adjusting the resistance values of variable resistor VR2 and resistor R4 or the capacity of capacitor C1. In other words, short-period charging-discharging recurs at a very high rising speed when the temperature of the portion to be heated is below the required level and the charging of capacitor C1 is effected primarily by the high-level output from differential amplifier DA, and long-period charging-discharging recurs at a very slow rising speed when the temperature of the portion to be heated is above the required level and the charging of capacitor C1 is effected primarily by the full-wave rectified voltage with its predetermined peak portions cut away.

It will further be noted that, when the charging voltage of the capacitor C1 is raised to a predetermined level to turn on the transistor UT to thereby permit the charge stored in the capacitor C1 to be discharged through the primary winding of the pulse transformer PT, there is produced, as shown in FIG. 11g, a continuous rising voltage or an intermittent rising voltage across said primary winding, if the temperature of the portion to be heated is below or above the required temperature level.

Simultaneously with the production of such voltage, an inverted voltage as shown in FIG. 11h is produced across the secondary winding of the pulse transformer PT, and such voltage is applied as input to the gate of Triac TA through rectifier D2.

Thus, the Triac TA will effect its ON operation in the presence of a voltage input at the gate thereof, but if the temperature of the portion to be heated is below the required temperature, continuous application of short-period voltage input to the gate of Triac TA will occur substantially throughout the entire period of the alternating current from the power source AC to the heating element H, so that substantially full power of said AC source is applied to the heating element H, as is shown in FIG. 11i, whereby the heating power of the heating element H is increased so as to act to raise the temperature of the portion to be heated. When such temperature exceeds the required level, application of intermittent voltage input to the gate of the Triac TA occurs with a suitably delayed phase at every half-period of the AC source being applied from the power source AC to the heating element H, so that a predetermined partial power with a suitable conduction angle at every half-period of the AC source is applied to the heating element H, as is shown in FIG. 11i, whereby the heating power of the heating element is decreased so as to act to suppress the temperature rise of the portion to be heated.

It will be noted that the selection of the conduction angle of the partial power when the portion to be heated is above the required temperature may readily be done by suitably adjusting the variable resistor VR2 provided in the charging circuit for capacitor C1. It is also possible to prevent occurrence of noise for the temperature above the required level by avoiding the high level of the AC waveform and determining the conduction angle of the partial power.

Figure 12:
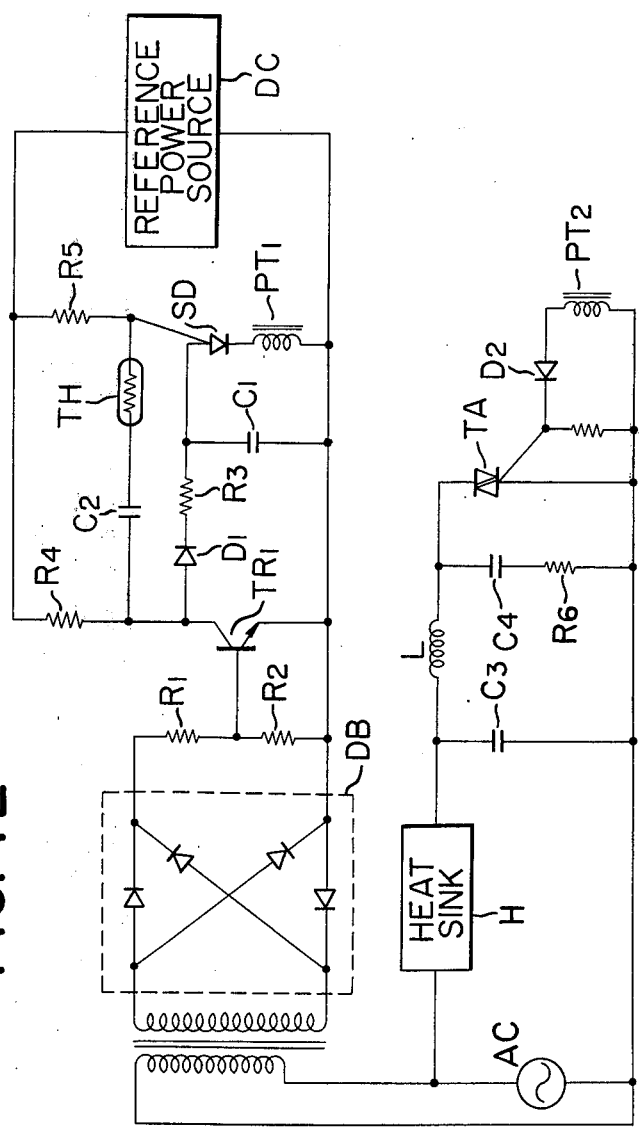
FIG. 12 diagrammatically shows a further form of the circuit arrangement of the temperature control system according to the present invention.

With reference to the circuit diagram of FIG. 12 and the waveform illustrating of FIG. 13, description will now be made of an embodiment in which, before the required temperature is reached, a power shown in FIGS. 7A, B, C and D comprising a combination of half-period powers of an AC source is applied to a heat sink in accordance with the temperature thereof to attain the required temperature, but when the required temperature is exceeded the aforesaid predetermined partial power is applied to the heat sink.

In the temperature control system of FIG. 8, as has been noted, the circuit of control means is arranged such that a partial power provided by half-period powers of the AC source is not applied to the heat sink until the required temperature is reached. In other words, independently of the temperature of the heat sink, pulse for the application of the said partial power is normally supplied from the pulse generator and the output of the thermosensitive element is directed to the control of the full power application.

In the present embodiment, there is a single pulse generator in the control means and the gate voltage of switching element applied to such generator is directly controlled by the output of thermosensitive element to determine the pulse interval, whereby the partial power application to the heat sink is controlled by switching means such as Triac or the like.

Operation of the present embodiment will generally be explained hereinafter.

The circuit arrangement is substantially similar to the circuit of FIG. 8 having the pulse generator for the application of the partial power. Resistors R4 and R5 are connected between the collector of transistor TR1 and power source DC and between the control electrode of diode SD and power source DC, respectively, and capacitor C2 and positive characteristic thermosensitive element, usually called posister, TH, are serially inserted between the collector of said transistor TR1 and the control electrode of said diode SD.

Since pulse transformer PT2 is inductively coupled to pulse transformer PT1, drive power is applied to heater H from the application of pulse to the pulse transformer PT2 till the AC source comes to zero potential, i.e. substantially during a half-period.

Now, the output of FIG. 9B rectified by bridge circuit DB is divided by resistors R1 and R2 and applied to the base of transistor TR1. If the threshold voltage of this transistor TR1 is represented by $l$ as shown in FIG. 13B, the collector potential can provide a pulse output P in the vicinity of the zero potential of the rectified output, as is shown in FIG. 13C. Such pulse output is supplied as through diode D1 and resistor R3 to capacitor C1 to raise the terminal potential thereof up to E1 as shown in FIG. 13d. After arrival of such pulse P1, the collector potential comes to zero to permit an initial current to flow through resistor R4 and through resistor R5, posister TH and capacitor C2. As a result, a voltage EG1 derived from the division by resistor R5 and posister TH, as shown in FIG. 13e, is applied to the gate of switching diode SD, but if it is assumed that the voltages EG1 and E1 are in the relation that E1<EG1, the charge in the capacitor C1 remains unchanged until arrival of the next pulse P2 thereto, whereupon the capacitor is again charged up to potential E2. Thereafter, the collector potential comes to zero and, if it is assumed that E2>EG2 is established when EG2 has been applied to the gate, then the charge stored in the capacitor C1 is discharged through switching element SD to produce a pulse as shown in FIG. 13f. Such pulse is phase-inverted, as shown in FIG. 13g, through pulse transformers PT1 and PT2 to drive Triac TA, whereby a drive power such as PW2 shown in FIG. 9h is applied to heater H.

In the foregoing, the resistance value of the posister has been described as constant, but this posister is disposed adjacent the heater H and the resistance value thereof is variable with temperature, and EG is also variable in such a manner that it is increased when the ambient temperature of the heater is higher and decreased when the ambient temperature is lower.

Therefore, if the ambient temperature of the heater H is sufficiently low, EG is decreased so that upon each arrival of such pulse P the potential E of the capacitor C1 satisfies the relation that $E > EG$ and accordingly, each arrival of pulse P produces a drive power which is applied to the heater in the waveform as generally shown in the left-hand portion of FIG. 13h.

Since, in the present embodiment, intermittent switching of Triac Ta is effected in the vicinity of substantially zero potential of the AC source, production of noise is minimized. Moreover, quick heating and stable condition of the required temperature can be provided because full power is applied to the heat sink at the initial stage of heating to provide a heating power and the power application occurs with the interval between half-period powers being gradually widened until the required temperature is attained. On the other hand, the present embodiment is somewhat slower is rising characteristic than the embodiment of FIG. 8 in which full power is applied to the heat sink when the portion to be heated is below required temperature, but the present embodiment undergoes very little temperature variation once the required temperature is reached.

Figure 14A:
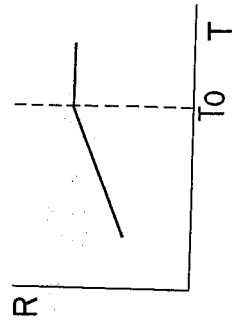
FIG. 14 illustrates the characteristic of the positive characteristic temperature detector means.
Figure 14B:
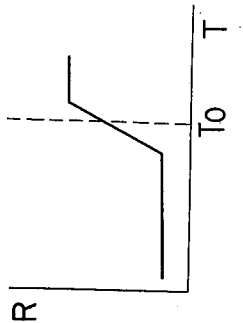

It will further be noted that if the temperature-resistance characteristic of the posister TH is flat with a suitable resistance R for the temperature range above the required level $T_0$, as is shown in FIG. 14a, a predetermined partial power will be applied to the heat sink even though the temperature is raised. It will also be apparent from FIG. 14b that the use of a posister TH capable of maintaining allow resistance for the temperature range below $T_0$ and having a similar, suitable, flat resistance characteristic for the temperature range above $T_0$ will enable application, to the heat sink, of full power for temperatures below $T_0$ and a predetermined partial power for temperatures above $T_0$.

Also, if the switching element SD is a PUT (Programable unijunction transistor) of quick rising characteristic, pulse may be produced substantially at the zero potential of the power source.

Thus, according to the present invention, uniform heating of a single heat sink may be provided to eliminate temperature irregularities and at the initial heating stage, a full power may be applied to the heat sink to improve the rising thereof. When the required temperature is reached, a predetermined partial power may be applied to reduce the temperature variation at the required temperature and increase the service life of the heat sink such as heater or the like. Further, production of noise can be greatly reduced due to the fact that the application of the full power and the partial power to the heat sink occurs in synchronism with the substantially zero potential of the AC power source or the low level of the AC waveform.

Figure 15:
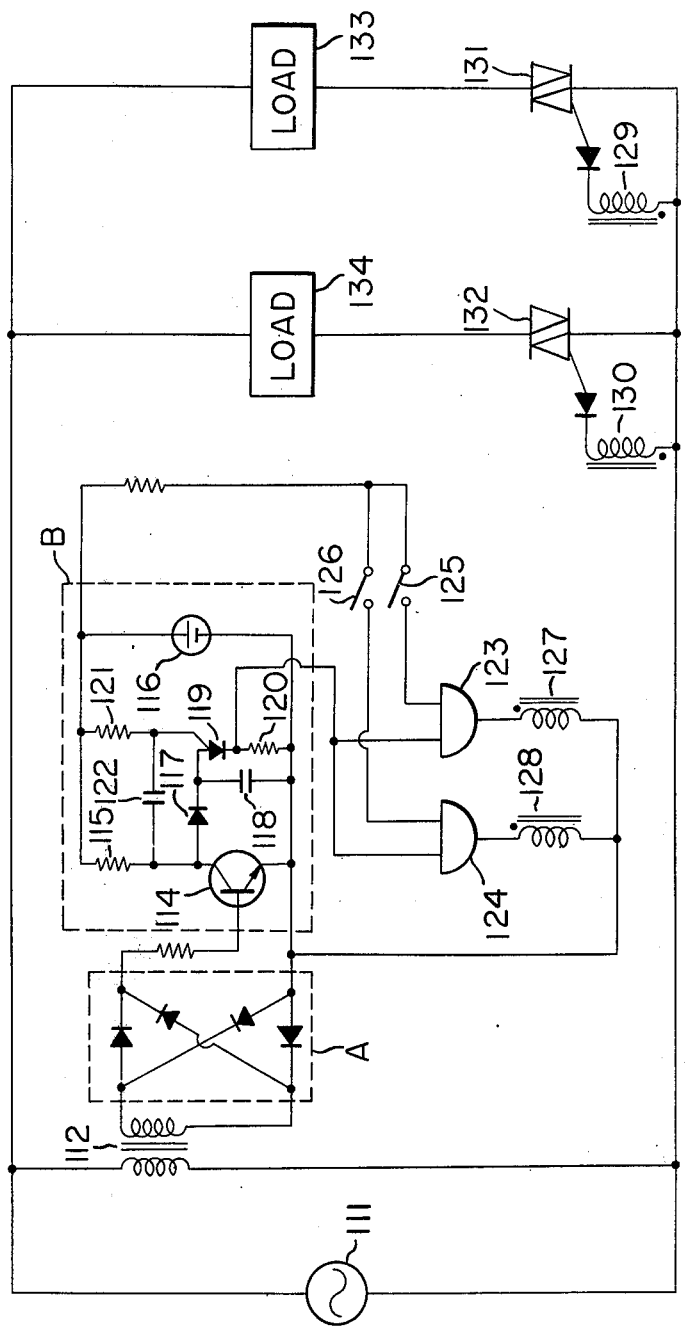
FIG. 15 shows a further embodiment of the present invention.

FIG. 15 shown an example of the means for detecting the substantially zero potential of such power source and effecting the switching of the power source in the vicinity of said potential.

Opening of a switch due to an inductive load usually causes production of a counter electromotive force. Removal means such as filter or the like for removing the noise resulting therefrom is expensive and difficult to design.

In FIG. 15, circuit A is a full-wave rectifier circuit and circuit B is one for detecting substantially zero potential and generating a pulse, the latter circuit having particularly been described in connection with FIGS. 8 and 12. In the circuit B, a pulse is generated across resistor 120 as the source voltage rises from zero. Such pulse signal is connected to the input of one of two input AND gates 123 and 124, and the input terminal of the other AND gate is connected to a DC source through load operating switches 125 and 126 while the input sides 127 and 128 of transformers are connected to the output of said other AND gate. AC control rectifier elements 131 and 132, connected to the output sides 129 and 130 of said pulse transformers, are inserted in a portion of a circuit connected for connecting loads 133 and 134 to AC source 111, and can control driving of the loads in response to ON-OFF of the AC control rectifier elements 131 and 132.

Thus, if the switch 125 is closed to drive the load 133, a DC signal is applied to the input of one of the AND gates, 123, and a pulse signal is applied to the input terminal of the other AND gate 124 only when the source voltage has become substantially zero, and therefore a pulse output is provided from the AND gate 123 only when said pulse signal has been applied. Such pulse output is passed to the input side of the pulse transformer to turn on the AC control rectifier element 131 connected to the output side of the same pulse transformer, thereby driving the load. Thus, the driving of the load is effected by the switch 125 and the AND output of the pulse signal, with a result that there is produced no noise due to the opening-closing of the switch 125.

We claim:
1. A temperature control system comprising:
a heat sink;
an AC power source for heating said heat sink;
means for detecting the temperature of said heat sink and to generate a signal corresponding to the detected temperature;
means, responsive to the signal, for generating a first control signal when the temperature detected by said detecting means is under a predetermined temperature;
means for generating a second control signal to supply a partial power of said AC power source to said heat sink when the temperature detected by said detecting means reaches the predetermined temperature;
means responsive to at least one of said, first and second control signals for controlling the supply of power from said power source to said heat sink;
whereby said heat sink is supplied with full power from said AC power source in response to said first control signal when the temperature detected by said detecting means is under the predetermined temperature, and said heat sink is supplied with the partial power from said AC power source in response to said second control signal when the temperature detected by said detecting means reaches the predetermined temperature.

2. A temperature control system according to claim 1, wherein said controlling means is conductively controlled in response to said second control signal, which has a repetitive period that is longer than that of said first control signal, to supply a half cycle power of a positive or negative polarity from said AC power source to said heat sink, when the temperature detected by said detecting means is higher than the predetermined temperature.

3. A temperature control system according to claim 1, wherein said first control signal generating means is responsive to a substantially zero level of potential every half cycle of a positive or negative polarity of said AC power source and is controlled in response to a signal of a predetermined level from said detecting means;
said second control signal generating means is responsive to a substantially zero level of potential every half cycle of said AC power source at a predetermined time and generates the second control signal which has a repetitive period that is longer than that of the first control signal;
the full power is supplied from said AC power source to said heat sink when the temperature detected by said detecting means is under the predetermined temperature, and switching is made from the full power supply to the partial power supply at the substantial zero level of potential, when the temperature reaches the predetermined temperature, to supply half cycle power of a positive or negative polarity from said AC power source to said heat sink.

4. A temperature control system according to claim 3, wherein said first control signal generating means comprises rectifier means for said AC power source, a first control element responsive to a signal of a predetermined level from said rectifier means for outputting an output signal, a first charging and discharging circuit connected to said first control element, and a second control element controllable in response to the output signal from said first control element and an output discharged from said charging and discharging circuit, said second control element generating a pulse signal as the first control signal;
said second control signal generating means comprises, second rectifier means for said AC power source, a third control element responsive to a signal of a predetermined level from said rectifier means for generating an output signal, a second charging and discharging circuit connected to said third control element, and a fourth control element controllable in response to the output signal from said third control element and an output from said second charging and discharging circuit for generating a pulse signal as a third control signal, whereby the first and second control signals are generated when the absolute value of said AC power source rises from zero.

5. A temperature control system according to claim 4, wherein the second control signal is generated in the proximity of zero potential by varying a time constant of said second charging and discharging circuit.

6. A temperature control system according to claim 1, wherein said first and second signal generating means are integrally composed, said integral signal generating means generates the first control signal in response to the signal from said detecting means generated when the temperature detected by said detecting means is under the predetermined temperature and the second control signal in response to the signal from said detecting means generated when the temperature detected by said detecting means is over the predetermined temperature.

7. A temperature control system according to claim 6, wherein said integral signal generating means generates the second control signal, which has a repetitive period that is longer than that of the first control signal, to conductively control said controlling means in order to supply a half cycle power of positive or negative polarity from said AC power source to said heat sink when the temperature detected by said detecting means is over the predetermined level.

8. A temperature control system according to claim 6, wherein said integral signal generating means comprises rectifier means for said AC power source, a control element responsive to a signal of a predetermined level from said rectifier means for outputting an output signal, a charging and discharging circuit connected to said control element, and another control element controllable in response to the output signal from said control element and a signal discharged from said charging and discharging circuit, and the first and second control signals are derived from an output signal from said other control element.

9. A temperature control system according to claim 1, wherein said first control signal generating means comprises a charging and discharging circuit common to said second control signal generating means, and means for cutting off the signal generated in said detecting means when the temperature is over the predetermined level, the first control signal is generated for conduction of said controlling means by bringing a time constant of said charging and discharging circuit to substantially zero by the signal generated in said detecting means when the temperature detected by said detecting means is under the predetermined level, and the second control signal is generated for conducting said controlling means at a predetermined angle by said cutting-off means and said charging and discharging circuit, when the temperature is over the predetermined level.

10. A temperature control system according to claim 9, wherein said cutting-off means is a directional element connected to said charging and discharging circuit.

11. A temperature control system comprising:
a heat sink;
an AC power source for heating said heat sink;
means for detecting the temperature in the proximity of said heat sink and generating a detecting signal;
means for generating a first control signal in response to the detecting signal when the temperature detected by said detecting means is under a predetermined level and for generating a second control signal, different from the first control signal, in response to the detecting signal when the temperature detected by said detecting means is over the predetermined level; and
means for controlling the supply of power from said AC power source to said heat sink in response to one of, the first and second control signals;
whereby full power of said AC power source is supplied to said heat sink in response to the first control signal when the temperature detected by said detecting means is under the predetermined level, and partial power of said AC power source is supplied to said heat sink in response to the second control signal when the temperature detected by said detecting means is over the predetermined level.

12. A temperature control system according to claim 11, wherein said signal generating means generates the second control signal which has a repetitive period that is longer than that of the first control signal in order to supply the power of a positive or negative polarity from said AC power source to said heat sink when the temperature detected by said detecting means is over the predetermined level, the second control signal controls the conduction of said controlling means.

13. A temperature control system according to claim 11, wherein said control signal generating means generates the first and second control signals at the time when the absolute value of said AC power source rises from a zero level, and the conduction of said controlling means is controlled in accordance with the zero potential signal.

14. A temperature control system according to claim 11, wherein said signal generating means comprises rectifier means for said AC power source, a control element responsive to an output of a predetermined level from said rectifier means for generating an output signal, a charging and discharging circuit connected to said control element, and another control element conductively controllable in response to the output signal from said control element and a discharging output from said charging and discharging circuit, the first and second control signals are derived from said other control element by varying the conduction of said other control element in accordance with the detecting signal generated in said detecting means.

15. A temperature control system comprising:
a load;
an AC power source for supplying power to said load;
signal generating means comprising, rectifier means for rectifying an output from said AC power source, a first control element responsive to a signal of a predetermined level from said rectifier means for generating an output signal, a charging and discharging circuit connected to said first control element, and a second control element conductively controllable in response to the output signal from said first control element and a discharged output from said charging and discharging circuit, said signal generating means generating a control signal in response to an output from said second control element when the absolute value of said AC power source rises from a zero potential; and
means for controlling the supply of power from said AC power source to said load in accordance with the control signal generating in said signal generating means, the supply of power being made in synchronism with a substantial potential of said AC power source.

16. A temperature control system according to claim 15, wherein the control signal is generated at the time when said AC power source is at zero potential by varying the conduction of said second control element.

17. A temperature control system according to claim 15, wherein the system further comprises, means for indicating the supply of power to said load, and means for rendering said controlling means conductive in response to the signal from said signal generating means as well as a signal generated in said indicating means, thereby to supply the power to said load.

* * * * *

UNITED STATES PATENT OFFICE
CERTIFICATE OF CORRECTION

Patent No. 3,937,921　　　　　　　　　Dated February 10, 1976

Inventor(s) KATSUSHI FURUICHI, ET AL.　　　　　Page 1 of 2

It is certified that error appears in the above-identified patent and that said Letters Patent are hereby corrected as shown below:

Column 1, line 15, "in" should read --is--;

Column 1, line 59, "are OFF condition" should read --are in OFF condition--;

Column 1, line 63, "wores" should read --wires--;

Column 3, line 49, "a full" should read --full--;

Column 3, line 50, "form" should read --from--;

Column 4, line 14, "heat sink 41" should read --heat sink 42--;

Column 4, line 20, "diamgram" should read --diagram--;

Column 4, line 47, "sresult" should read --result--;

Column 5, line 35, "resistor" should read --resistors--;

Column 6, line 24, "tranistor" should read --transistor--;

Column 6, line 24, "state." should read --state,--;

Column 7, line 7, "temporally" should read --temporarily--;

Column 7, line 12, "OFF state" should read --an OFF state--;

Column 7, line 13, "because" should read --because of--;

Column 7, line 13, "value of" should read --applied to--;

Column 7, line 14, "element," should read --element--;

Column 7, line 18, "on" should read --off--;

UNITED STATES PATENT OFFICE
CERTIFICATE OF CORRECTION

Patent No. 3,937,921         Dated February 10, 1976

Inventor(s) KATSUSHI FURUICHI, ET AL.         Page 2 of 2

It is certified that error appears in the above-identified patent and that said Letters Patent are hereby corrected as shown below:

Column 10, line 66, "illustrating" should read --illustration--;

Column 12, line 4, "positer" should read --posister--;

Column 12, line 27, "is" (second occurrence) should read --in--;

Column 12, line 41, "alow" should read --a low--;

Column 12, line 65, "shown" should read --shows--;

Signed and Sealed this twenty-ninth Day of June 1976

[SEAL]

Attest:

RUTH C. MASON
*Attesting Officer*

C. MARSHALL DANN
*Commissioner of Patents and Trademarks*